US011443552B2

(12) United States Patent
Shibata (10) Patent No.: US 11,443,552 B2
(45) Date of Patent: Sep. 13, 2022

(54) IMAGE PATTERN SIMILARITY CALCULATION DEVICE AND RECOGNITION DEVICE

(71) Applicant: Kabushiki Kaisha Toshiba, Tokyo (JP)

(72) Inventor: Tomoyuki Shibata, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/258,230

(22) Filed: Sep. 7, 2016

(65) Prior Publication Data

US 2017/0270351 A1 Sep. 21, 2017

(30) Foreign Application Priority Data

Mar. 17, 2016 (JP) .............................. JP2016-054440

(51) Int. Cl.
 *G06V 40/16* (2022.01)
 *G06K 9/62* (2022.01)
 *G06V 30/242* (2022.01)

(52) U.S. Cl.
 CPC ......... *G06V 40/172* (2022.01); *G06K 9/6215* (2013.01); *G06V 30/242* (2022.01); *G06V 40/168* (2022.01)

(58) Field of Classification Search
 CPC ............. G06K 9/6202; G06K 9/00288; G06K 9/00228; G06K 9/00268; G06K 9/00536;
 (Continued)

(56) References Cited

U.S. PATENT DOCUMENTS 9,070,041 B2 6/2015 Sato et al.
9,122,956 B1 * 9/2015 Fink ..................... G06K 9/6232
(Continued)

FOREIGN PATENT DOCUMENTS

JP 2011-100229 5/2011
JP 2011-107795 6/2011
(Continued)

OTHER PUBLICATIONS

N. Dalal et al., "Histograms of Oriented Gradients for Human Detection", IEEE Computer Society Conference on Computer Vision and Pattern Recognition, vol. 1, pp. 886-893 (2005).

*Primary Examiner* — Kenny A Cese
(74) *Attorney, Agent, or Firm* — Finnegan, Henderson, Farabow, Garrett & Dunner L.L.P (57) ABSTRACT

According to an embodiment, a calculation device includes a registerer, a first calculator, a receiver, and a second calculator. The registerer registers a plurality of patterns. The first calculator calculates a degree of closeness between the registered patterns. The receiver receives an input pattern. The second calculator calculates a first similarity value between the input pattern and a first registered pattern among the plurality of registered patterns, calculates second similarity values between the input pattern and one or more second registered patterns having a neighbor relationship with the first registered pattern among the plurality of registered patterns, and calculates a combined similarity value in which the first similarity value and the one or more second similarity values are combined.

18 Claims, 9 Drawing Sheets

(58) Field of Classification Search
CPC ... G06K 9/6215; G06T 7/11; G06F 17/30598; H04J 1/10; H04J 2/10; H04J 1/02; G06V 40/172; G06V 40/168; G06V 30/242
USPC .............................................. 364/2; 382/118
See application file for complete search history.

(56) References Cited

U.S. PATENT DOCUMENTS

| | | | |
|---|---|---|---|
| 2006/0115125 A1* | 6/2006 | Yuasa | G06T 7/74 382/104 |
| 2011/0103695 A1* | 5/2011 | Sato | G06V 10/44 382/190 |
| 2011/0158536 A1* | 6/2011 | Nakano | G06K 9/00281 382/190 |
| 2012/0230545 A1* | 9/2012 | Zhang | G06K 9/6227 382/103 |
| 2014/0301634 A1 | 10/2014 | Ishii | |
| 2015/0065836 A1* | 3/2015 | Thakur | A61B 5/0422 600/374 |
| 2015/0278224 A1* | 10/2015 | Jaber | G06F 16/583 707/758 |
| 2015/0278249 A1* | 10/2015 | Akiyama | G06K 9/6892 382/305 |

FOREIGN PATENT DOCUMENTS

| | | |
|---|---|---|
| JP | 2011-138387 A | 7/2011 |
| JP | 2014-153763 | 8/2014 |
| WO | WO 2013/088707 A1 | 6/2013 |

* cited by examiner

IMAGE PATTERN SIMILARITY CALCULATION DEVICE AND RECOGNITION DEVICE

CROSS-REFERENCE TO RELATED APPLICATIONS

This application is based upon and claims the benefit of priority from Japanese Patent Application No. 2016-054440, filed on Mar. 17, 2016; the entire contents of which are incorporated herein by reference.

FIELD

Embodiments described herein relate generally to a calculation device and a recognition device.

BACKGROUND

In the related art, in order to perform pattern recognition or the like, there is known a technique of calculating a similarity value indicating similarity between a registered pattern and an input pattern.

As such a technique, for example, when performing face recognition, in order to prevent a variation in a similarity value to a face image as the registered pattern and false recognition due to variation factors such as an accessory such as eyeglasses attached to a face appearing in a face image as the input pattern or a variation in image quality, there is known a technique of calculating, in addition to a similarity value between the input pattern and the registered pattern, a similarity value between a deteriorated pattern obtained by performing a deteriorating process on an input pattern and a registered pattern and combining both similarity values.

DETAILED DESCRIPTION

According to an embodiment, a calculation device includes a registerer, a first calculator, a receiver, and a second calculator. The registerer registers a plurality of patterns. The first calculator calculates a degree of closeness between the registered patterns. The receiver receives an input pattern. The second calculator calculates a first similarity value between the input pattern and a first registered pattern among the plurality of registered patterns, calculates second similarity values between the input pattern and one or more second registered patterns having a neighbor relationship with the first registered pattern among the plurality of registered patterns, and calculates a combined similarity value in which the first similarity value and the one or more second similarity values are combined.

Hereinafter, embodiments will be described in detail with reference to the accompanying drawings.

First Embodiment

Figure 1:
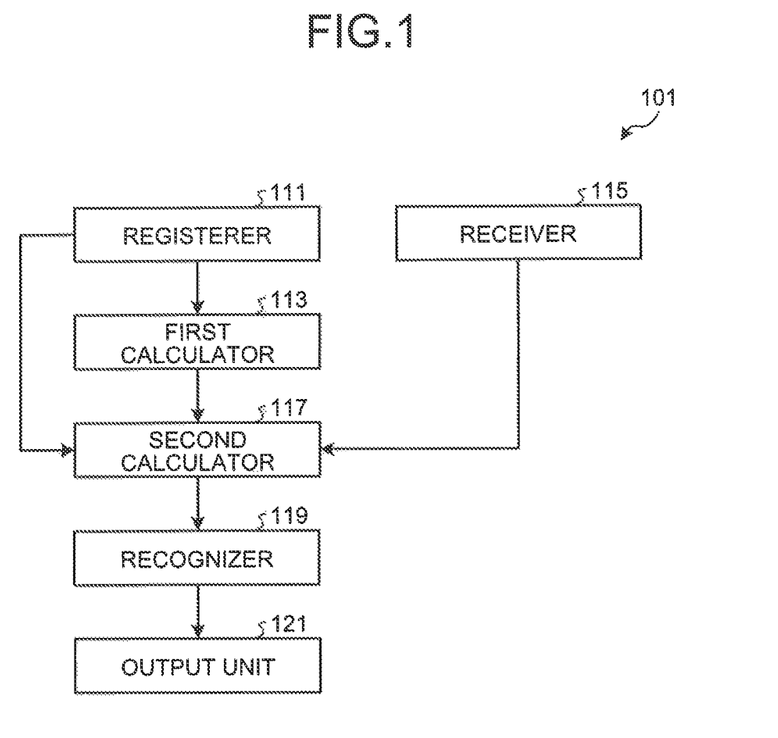
FIG. 1 is a diagram illustrating an example of a configuration of a recognition device according to a first embodiment.

FIG. 1 is a diagram illustrating an example of a configuration of a recognition device 101 according to a first embodiment. As illustrated in FIG. 1, the recognition device 101 includes a registerer 111, a first calculator 113, a receiver 115, a second calculator 117, a recognizer 119, and an output unit 121.

The registerer 111, the first calculator 113, the receiver 115, the second calculator 117, the recognizer 119, and the output unit 121 may be embodied by causing a processor such as a central processing unit (CPU) to execute a program, that is, by software, may be embodied by hardware such as an integrated circuit (IC), or may be embodied by use of both, software and hardware.

The registerer 111 registers plural registered patterns. For example, the registerer 111 registers plural registered patterns in a storage (not illustrated) such as a hard disk drive (HDD) or a solid state drive (SSD).

An example of the registered pattern is a set of a feature value of a target extracted from an image obtained by imaging the target and a category to which the target belongs, but is not limited thereto.

Examples of the target include an object, a face, and a character, but are not limited thereto. The feature value is, for example, an arbitrary-dimensional vector. The feature value may be extracted from an image in any way, and may be extracted, for example, using histograms of oriented gradients which are disclosed in Dalal N, Triggs B (2005) Histograms of oriented gradients for human detection. In: Computer Vision and Pattern Recognition, IEEE Computer Society Conference on Volume vol. 1, pp. 886-893. Since a base of a subspace is expressed by a main component vector of plural vectors, the registered pattern (feature value) may be a base of a subspace which is expressed in a subspace method.

The first calculator 113 calculates a degree of closeness between the registered patterns which are registered by the registerer 111. In the first embodiment, the degree of closeness is defined based on a closeness order in a metric. The metric can be roughly divided into a similarity value and a distance and is not limited to only any one thereof.

For example, when the metric is a similarity value, the first calculator 113 can calculate the degree of closeness using normalized cross-correlation. In this case, as the degree of closeness approaches one, it represents closeness. As the degree of closeness approaches zero, it represents non-closeness. When the registered pattern is in a subspace, a similarity value between subspaces can be calculated using, for example, a mutual subspace method and can be defined as an angle called principal angle. N principal angles can be defined between N-dimensional subspaces, and a maximum value or the like is used.

For example, when the metric is a distance, L2 norm, L1 norm, L0 norm, L∞ norm, or the like is used and the first calculator 113 can calculate a degree of closeness (distance) according to its definition.

A registered pattern having a neighbor relationship with a registered pattern $x_i$ is expressed by $N_k(x_i)=x_j$, which represents that a j-th registered pattern $x_j$ is a k-th closeness pattern of the registered pattern $x_i$. Here, k is a predetermined fixed value (for example, k=10) and maximum k registered patterns having a neighbor relationship with the registered pattern $x_i$ are held.

The receiver 115 receives an input pattern. An example of the input pattern is a feature value of a target which is extracted from an image obtained by imaging the target, but is not limited thereto.

The second calculator 117 calculates, for each registered pattern registers d by the registerer 111, a first similarity value between a first registered pattern which is the registered pattern and the input pattern received by the receiver 115; calculates a second similarity value between each of one or more second registered patterns having a neighbor relationship (k-nearest neighbor relationship) with the first registered pattern among plural registered patterns registered by the registerer 111 and the input pattern; and calculates a combined similarity value in which the first similarity value and the one or more second similarity values are combined. It is not necessary to calculate the combined similarity value for all the registered patterns registered by the registerer 111, and the combined similarity value may be calculated for one or more specific registered patterns registered by the registerer 111.

As described above, when the feature value is a vector, the first similarity value and the second similarity value may be calculated using normalized cross-correlation or may be calculated to be a reciprocal of the distance calculated by the metric. As described above, when the feature value is a base of a subspace, the first similarity value and the second similarity value may be calculated using a mutual subspace method.

The combined similarity value may be, for example, a weighted sum of the similarity values (the first similarity value and the second similarity values). A fixed value which is calculated by machine learning in advance can be used as a we factor.

Figure 2:
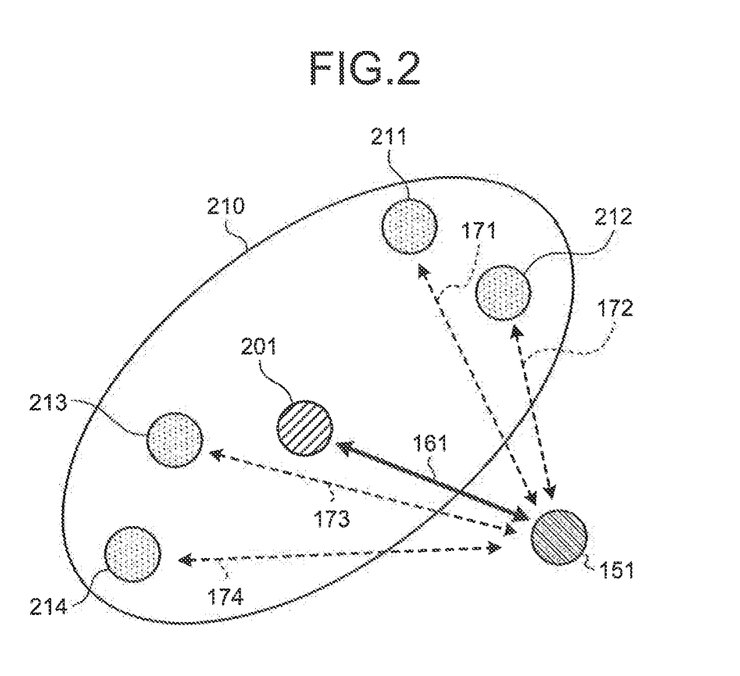
FIG. 2 is a diagram illustrating an example of a first similarity value and a second similarity value in the first embodiment.

FIG. 2 is a diagram illustrating an example of the first similarity value and the second similarity value in the first embodiment. In the example illustrated in FIG. 2, a pattern 201 is a first registered pattern (hereinafter, referred to as a "first registered pattern 201"). A pattern 151 is an input pattern (hereinafter, referred to as an "input pattern 151").

Patterns 211 to 214 are one or more second registered patterns (hereinafter, referred to as "second registered patterns 211 to 214") having a neighbor relationship with the first registered pattern 201. That is, in the example illustrated in FIG. 2, k=4 and the second registered patterns 211 to 214 are patterns of which the degree of closeness to the first registered pattern 201 is included in top four degrees of closeness.

In this case, the second calculator 117 calculates a similarity value 161 between the first registered pattern 201 and the input pattern 151 as the first similarity value. The second calculator 117 calculates a similarity value 171 between the second registered pattern 211 and the input pattern 151, a similarity value 172 between the second registered pattern 212 and the input pattern 151, a similarity value 173 between the second registered pattern 213 and the input pattern 151, and a similarity value 174 between the second registered pattern 214 and the input pattern 151 as one or more second similarity values. The second calculator 117 combines the similarity value 161, the similarity value 171, the similarity value 172, the similarity value 173, and the similarity value 171 to calculate a combined similarity value.

The recognizer 119 recognizes the input pattern received by the receiver 115 based on plural combined similarity values which are calculated by the second calculator 117.

For example, the recognizer 119 recognizes the input pattern based on the first registered pattern in which a combined similarity value having the highest similarity value among the plural combined similarity values is calculated. In this case, the recognizer 119 recognizes, for example, that the input pattern belongs to a category of the first registered pattern in which the combined similarity value having the highest similarity value is calculated.

For example, the recognizer 119 recognizes the input pattern based on one or more first registered patterns in which a combined similarity value having a similarity value equal to or greater than a threshold value among the plural combined similarity values is calculated. In this case, the recognizer 119 calculates, for example, a probability that the input pattern belongs to categories of one or more first registered patterns in which a combined similarity value having a similarity value equal to or greater than a threshold value is calculated.

The output unit 121 outputs the recognition result of the recognizer 119. For example, the output unit 121 outputs at least one of a category to which the input pattern belongs, the probability that the input pattern belongs to the category, and a combined similarity value used to determine (recognize) the category.

Figure 3:
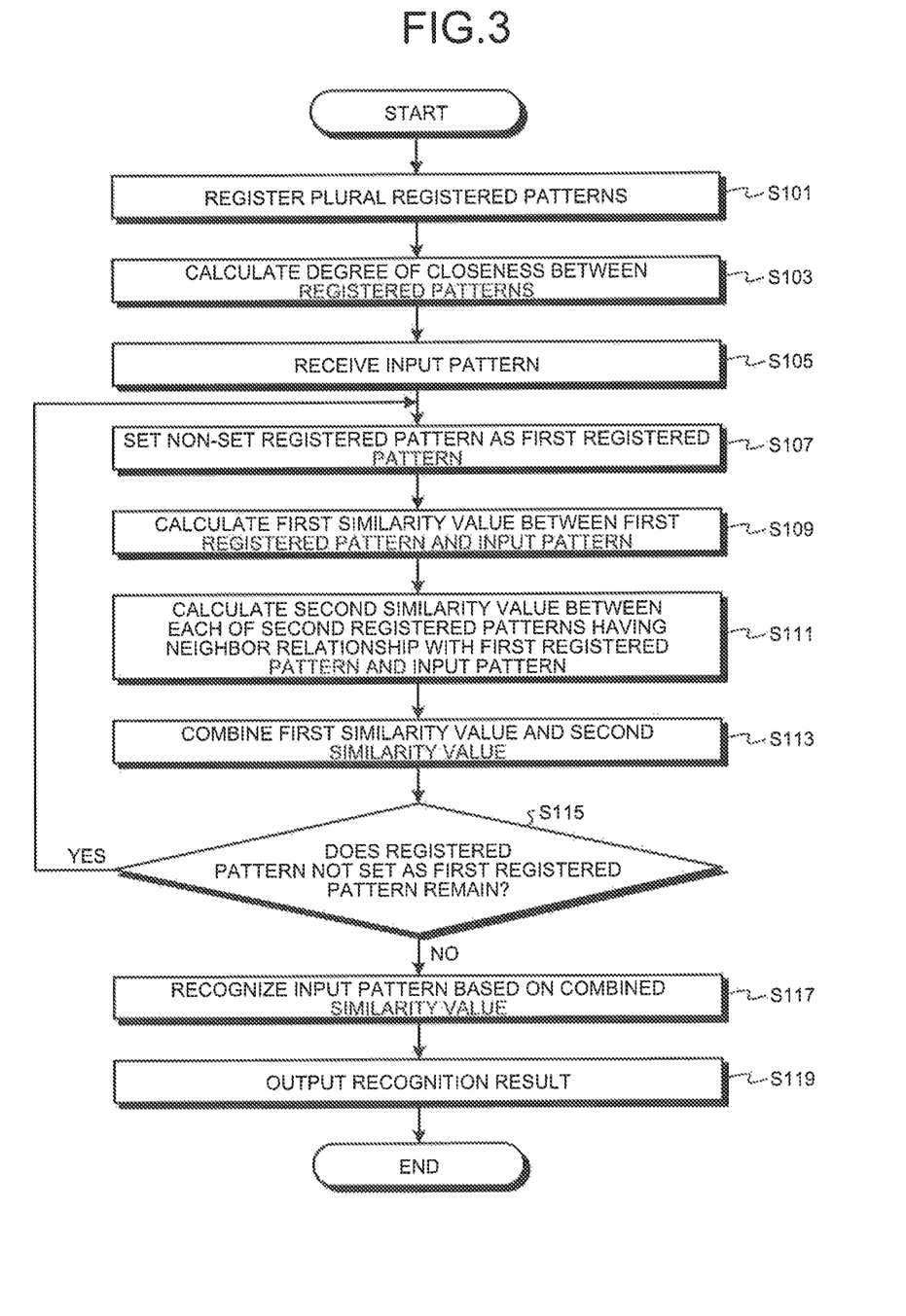
FIG. 3 is a flowchart illustrating an example of a process flow according to the first embodiment.

FIG. 3 is a flowchart illustrating an example of a process flow in the first embodiment.

First, the registerer 121 registers plural registered patterns (Step S101).

Subsequently, the first calculator 113 calculates degrees of closeness between the registered patterns registered by the registerer 111 (Step S103).

Subsequently, the receiver 115 receives an input pattern (Step S105).

Subsequently, the second calculator 117 sets a registered pattern, which is not yet set as a first registered pattern, among the registered patterns registered by the registerer 111 as the first registered pattern (Step S107).

Subsequently, the second calculator 117 calculates a first similarity value between the first registered pattern and the input pattern (Step S109).

Subsequently, the second calculator 117 calculates a second similarity value between each of one or more second registered patterns having a neighbor relationship with the first registered pattern among the plural registered patterns registered by the registerer 111 and the input pattern (Step S111).

Subsequently, the second calculator 117 combines the calculated first similarity value and the one or more second similarity values to calculate a combined similarity value (Step S113).

Thereafter, the processes of Steps S107 to S113 are repeatedly performed until a registered pattern not set as the first registered pattern does not remain in the plural registered patterns registered by the registerer 111 (YES in Step S115).

Subsequently, when a registered pattern not yet set as the first registered pattern does not remain (NO in Step S115), the recognizer 119 recognizes the input pattern received by the receiver 115 based on the plural combined similarity values calculated by the second calculator 117 (Step S117).

Subsequently, the output unit 121 outputs the recognition result of the recognizer 119 or the like (Step S119).

As described above, according to the first embodiment, since the similarity value between the first registered pattern and the input pattern is calculated using the second similarity values between one or more second registered patterns having a neighbor relationship with the first registered pattern and the input pattern in addition to the first similarity value between the first registered pattern and the input pattern, it is possible to suppress an increase in cost and to enhance calculation accuracy of a similarity value. Specifically, a correct answer distribution and an incorrect answer distribution can be separated from each other.

Particularly, according to the first embodiment, even when the first similarity value is lower than supposed as well as when the first similarity value between the first registered pattern and the input pattern is higher than supposed, it is possible to enhance calculation accuracy of the similarity value between the first registered pattern and the input pattern.

First Modified Example

Figure 4:
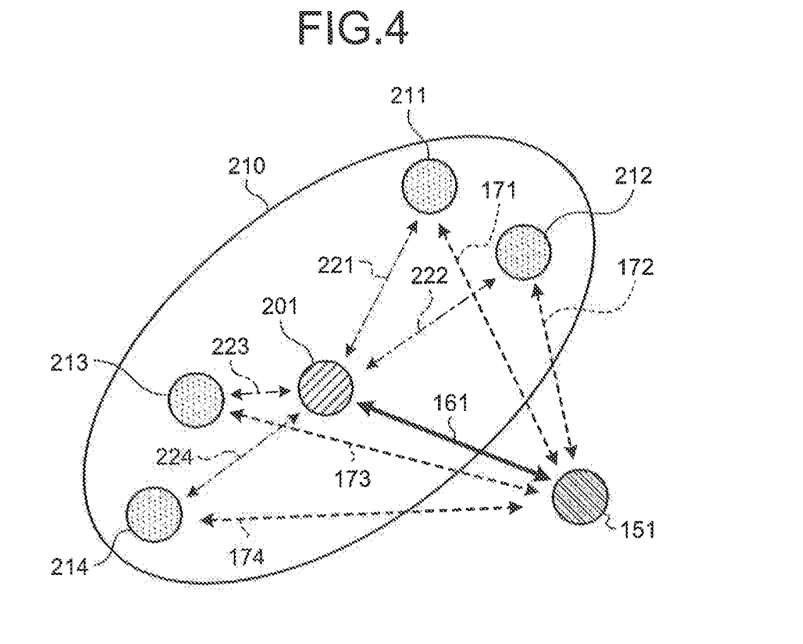
FIG. 4 is a diagram illustrating an example of a first similarity value, a second similarity value, and a degree of closeness in a first modified example.

The combined similarity value in the first embodiment may include a degree of closeness between each of one or more second registered patterns and the first registered pattern. In this case, the second calculator 117 can combine the first similarity value, one or more second similarity values, and the degree of closeness between each of one or more second registered patterns and the first registered pattern to calculate a combined similarity value.

FIG. 4 is a diagram illustrating an example of the first similarity value, the second similarity value, and the degree of closeness in the first modified example. In the example illustrated in FIG. 4, the second calculator 117 combines a degree of closeness 221 between the second registered pattern 211 and the first registered pattern 201, a degree of closeness 222 between the second registered pattern 212 and the first registered pattern 201, a degree of closeness 223 between the second registered pattern 213 and the first registered pattern 201, and a degree of closeness 224 between the second registered pattern 214 and the first registered pattern 201 in addition to the similarity value 161, the similarity value 171, the similarity value 172, the similarity value 173, and the similarity value 174 described in the example illustrated in FIG. 2 to calculate a combined similarity value.

Second Embodiment

In a second embodiment, an example in which the same combined similarity value is calculated even when the input pattern and the first registered pattern are replaced with each other will be described. In the following description, differences from the first embodiment will be mainly described, and elements having the same functions as in the first embodiment will be referenced by the same names and reference signs as in the first embodiment and description thereof will not be repeated.

Figure 5:
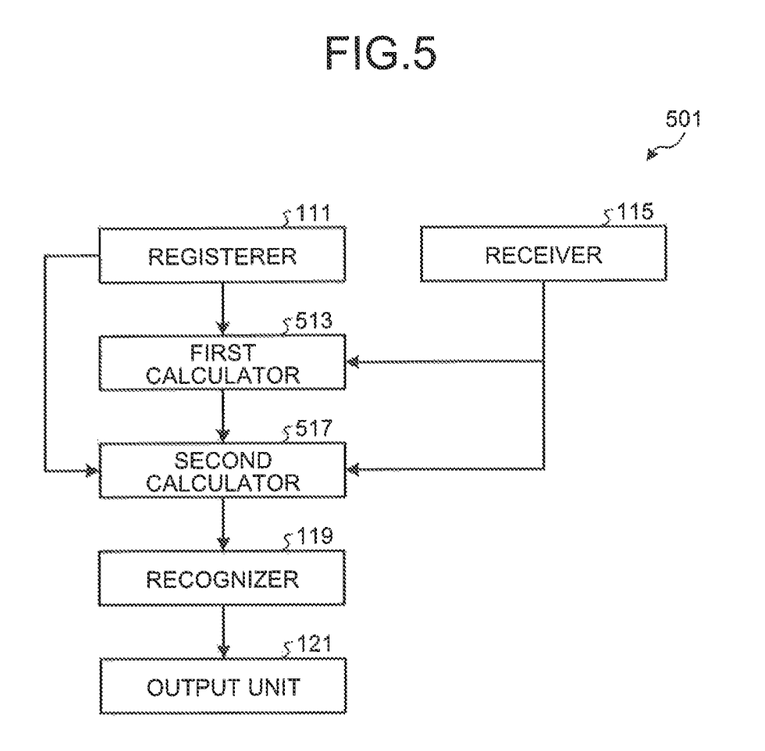
FIG. 5 is a diagram illustrating an example of a configuration of a recognition device according to a second embodiment.

FIG. 5 is a diagram illustrating an example of a configuration of a recognition device 501 according to the second embodiment. As illustrated in FIG. 5, the recognition device 501 is different from the recognition device according to the first embodiment in a first calculator 513 and a second calculator 517.

The first calculator 513 further calculates a degree of closeness between each of plural registered patterns registered by the registerer 111 and an input pattern received by the receiver 115. The method of calculating the degree of closeness is the same as the method of calculating the degree of closeness between the registered patterns, which is described in the first embodiment.

The second calculator 517 further calculates a third similarity value between each of one or more third registered patterns having a neighbor relationship with the input pattern among the plural registered patterns registered by the registerer 111 and the first registered pattern, and combines the first similarity value, the one or more second similarity values, and the one or more third similarity values to calculate a combined similarity value. The method of calculating the first similarity value, the method of calculating the second similarity value, and the method of calculating the combined similarity value are the same as in the first embodiment.

Figure 6:
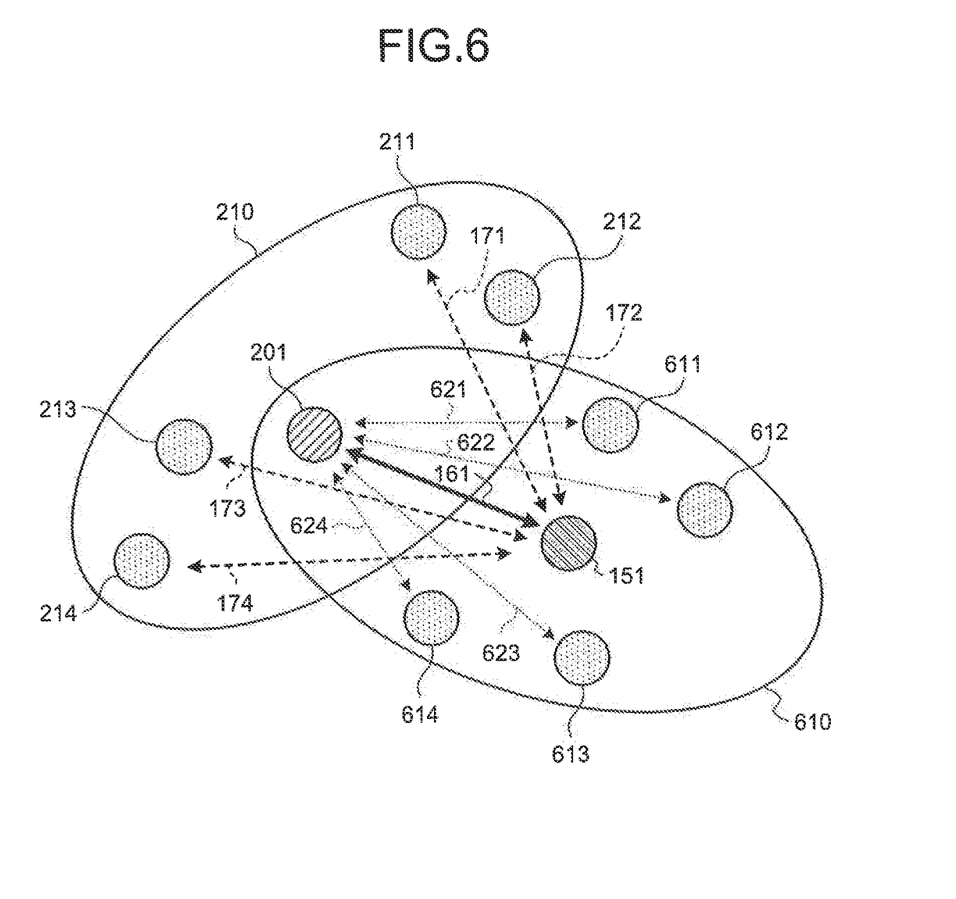
FIG. 6 is a diagram illustrating an example of a first similarity value, a second similarity value, and a third similarity value in the second embodiment.

FIG. 6 is a diagram illustrating an example of the first similarity value, the second similarity value, and the third similarity value in the second embodiment. In the example illustrated in FIG. 6, the first registered pattern 201, the input pattern 151, the second registered patterns 211 to 214, the similarity value 161, the similarity value 171, the similarity value 172, the similarity value 173, and the similarity value 174 are the same as illustrated in FIG. 2.

In the example illustrated in FIG. 6, patterns 611 to 614 are one or more third registered patterns hereinafter, referred to as "third registered patterns 611 to 614") having a neighbor relationship with the input pattern 151. That is, in the example illustrated in FIG. 6, k=4 and the third registered patterns 611 to 614 are patterns of which the degree of closeness to the input pattern 151 is included in top four degrees of closeness.

In this case, the second calculator 517 further calculates a similarity value 621 between the third registered pattern 611 and the first registered pattern 201, a similarity value 622 between the third registered pattern 612 and the first registered pattern 201, a similarity value 623 between the third registered pattern 613 and the first registered pattern 201, and a similarity value 624 between the third registered pattern 614 and the first registered pattern 201 as one or more third similarity values. The second calculator 517 combines the similarity value 161, the similarity value 171, the similarity value 172, the similarity value 173, the similarity value 174, the value 621, the similarity value 622, the similarity value 623, and the similarity value 624 to calculate a combined similarity value.

Figure 7:
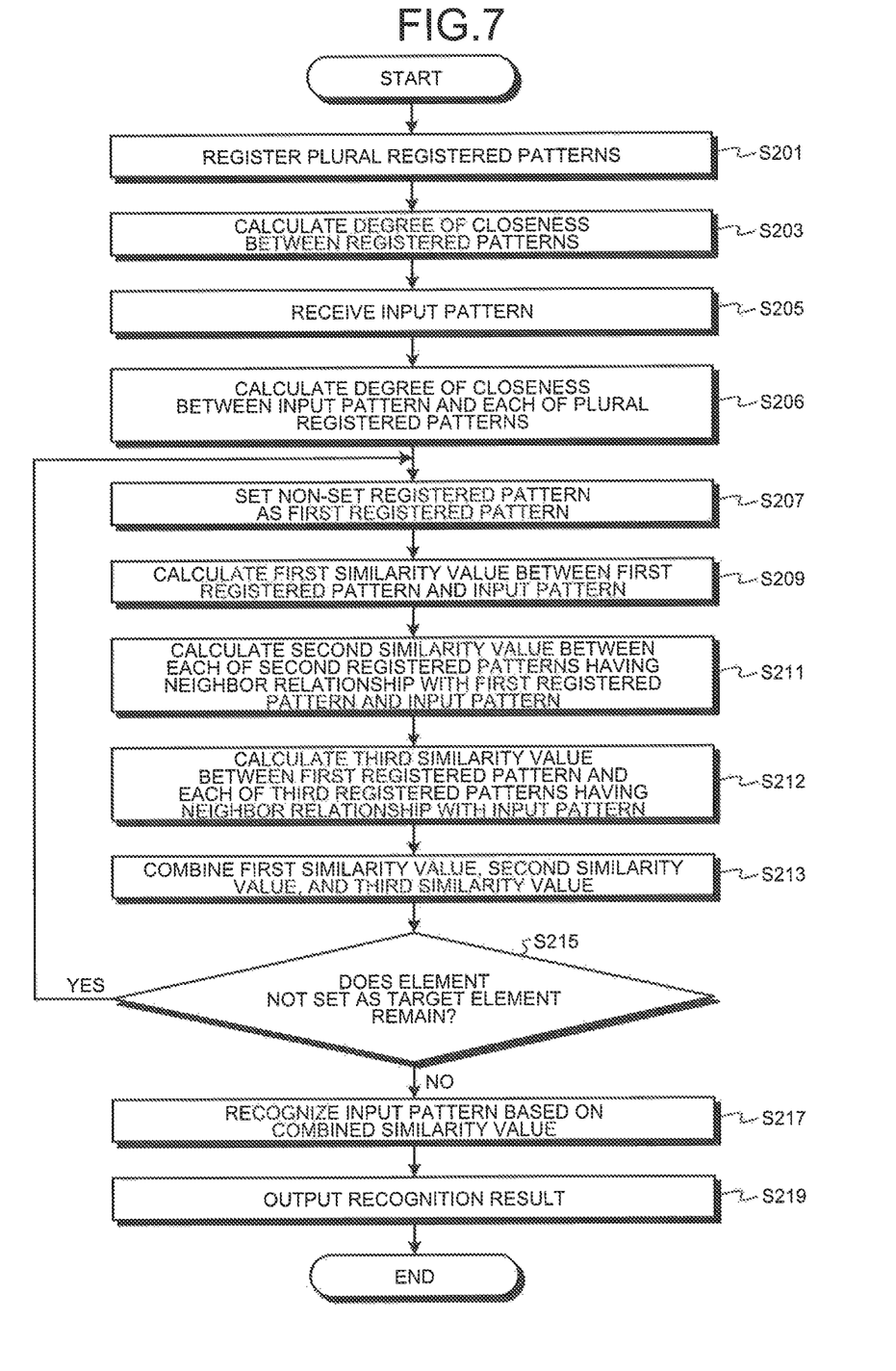
FIG. 7 is a flowchart illustrating an example of a process flow according to the second embodiment.

FIG. 7 is a flowchart illustrating an example of a process flow in the second embodiment.

First, the processes of Steps S201 to S205 are the same as the processes of Steps S101 to S105 in the flowchart illustrated in FIG. 3.

Subsequently, the first calculator 513 calculates a degree of closeness between each of the plural registered patterns registered by the registerer 111 and the input pattern received by the receiver 115 (Step S206).

Subsequently, the processes of Steps S207 to S211 are the same as the processes of Steps S107 to S111 in the flowchart illustrated in FIG. 3.

Subsequently, the second calculator 517 calculates a third similarity value between each of one or more third registered patterns having a neighbor relationship with the input pattern among the plural registered patterns registered by the registerer 111 and the first registered pattern (Step S212.

Subsequently, the second calculator 517 combines the calculated first similarity value, one or more second similarity values, and one or more third similarity values to calculate a combined similarity value (Step S213).

The processes of Steps S215 to S219 are the same as the processes of Steps S115 to S119 in the flowchart illustrated in FIG. 3.

As described above, the same advantages as in the first embodiment, can be achieved in the second embodiment. Particularly, according to the second embodiment, the combined similarity value includes the third similarity value between each of one or more third registered patterns having a neighbor relationship with the input pattern and the first registered pattern. Accordingly, even when the input pattern and the first registered pattern are replaced, the same combined similarity value can be calculated. Accordingly, when performing 1:1 type recognition, it is possible to calculate the same combined similarity value in spite of replacement of the input pattern and the first registered pattern.

Second Modified Example

The combined similarity value in the second embodiment may include a degree of closeness between each of one or more second registered patterns and the first registered pattern and a degree of closeness between each of one or more third registered patterns and the input pattern. In this case, the second calculator 517 can combine the first similarity value, one or more second similarity values, one or more third similarity values, the degree of closeness between each of one or more second registered patterns and the first registered pattern, and the degree of closeness between each of one or more third registered patterns and the input pattern to calculate a combined similarity value.

Figure 8:
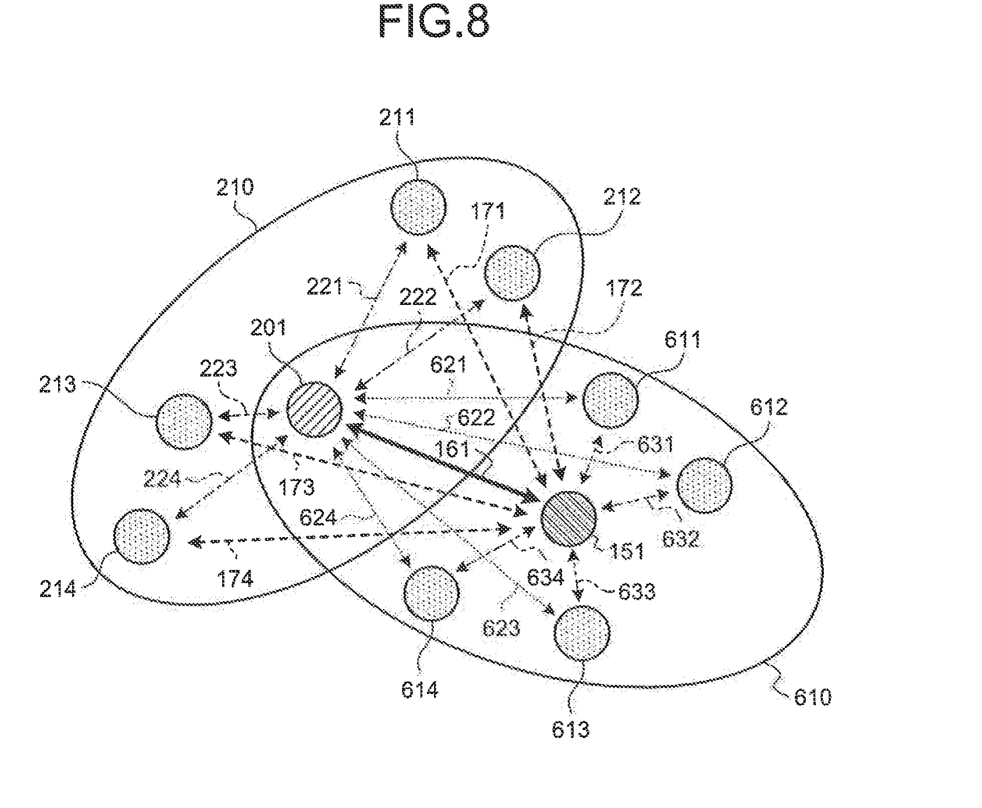
FIG. 8 is a diagram illustrating an example of a first similarity value, a second similarity value, a third similarity value, and a degree of closeness in a second modified example.

FIG. 8 is a diagram illustrating an example of the first similarity value, the second similarity value, the third similarity value, and the degree of closeness in the second modified example, in the example illustrated in FIG. 8, the second calculator 517 combines a degree of closeness 221 between the second registered pattern 211 and the first registered pattern 201, a degree of closeness 222 between the second registered pattern 212 and the first registered pattern 201, a degree of closeness 223 between the second registered pattern 213 and the first registered pattern 201, and a degree of closeness 224 between the second registered pattern 214 and the first registered pattern 201, a degree of closeness 631 between the third registered pattern 611 and the input pattern 151, a degree of closeness 632 between the third registered pattern 612 and the input pattern 151, a degree of closeness 633 between the third registered pattern 613 and the input pattern 151, and a degree of closeness 634 between the third registered pattern 614 and the input pattern 151, in addition to the similarity value 161, the similarity value 171, the similarity value 172, the similarity value 173, the similarity value 174, the similarity value 621, the similarity value 622, the similarity value 623, and the similarity value 624 described in the example illustrated in FIG. 6 to calculate a combined similarity value.

Third Modified Example

In the first embodiment, when the number of registered patterns is insufficient, reference patterns may be used. A reference pattern is a pattern prepared in advance to supplement the registered patterns, and an example thereof is a feature value of a target extracted from an image obtained by imaging the target, but is not limited thereto.

Figure 9:
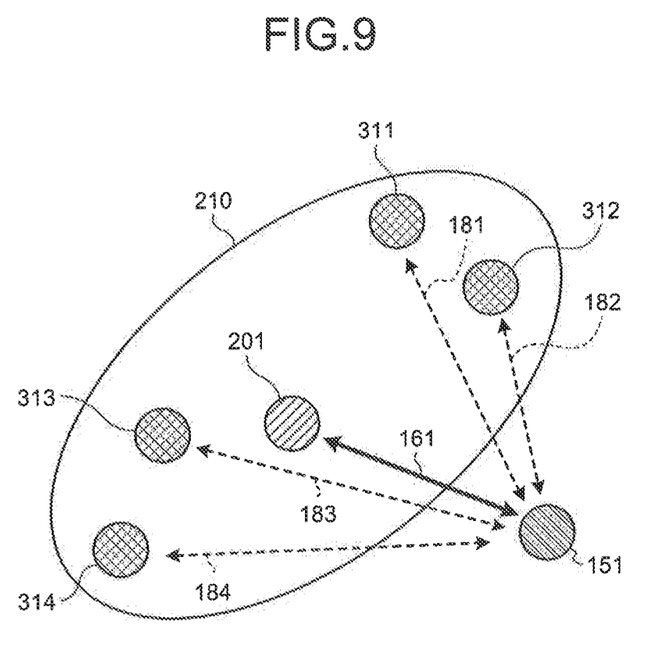
FIG. 9 is a diagram illustrating an example of a first similarity value and a second similarity value in a third modified example.

In this case, the first calculator 513 sets plural reference patterns and additionally calculates a degree of closeness between each of the plural registered pattern and each of the plural reference patterns. The method of calculating the degree of closeness is the same as the method of calculating the degree of closeness between the registered patterns, which is described in the first embodiment.

The second calculator 517 calculates a similarity value between each of one or more second registered patterns and first reference patterns having a neighbor relationship with the first registered pattern among the plural registered patterns and the plural reference patterns and the input pattern as one or more second similarity values.

FIG. 9 is a diagram illustrating an example of the first similarity value and the second similarity value in the third modified example. In the example illustrated in FIG. 9, the first registered pattern 201, the input pattern 151, and the similarity value 161 are the same as illustrated in FIG. 2.

In the example illustrated in FIG. 9, patterns 311 to 314 are one or more first reference patterns (hereinafter, referred to as "first reference patterns 311 to 314") having a neighbor relationship with the first registered pattern 201. That is, in the example illustrated in FIG. 9, k=4 and the first reference patterns 311 to 314 are patterns of which the degree of closeness to the first registered pattern 201 is included in top four degrees of closeness. In the example illustrated in FIG. 9, there is no second registered pattern having a neighbor relationship with the first registered pattern 201.

In this case, the second calculator 517 calculates a similarity value 181 between the first reference pattern 311 and the input pattern 151, a similarity value 182 between the first reference pattern 312 and the input pattern 151, a similarity value 183 between the first reference pattern 313 and the input pattern 151, and a similarity value 184 between the first reference pattern 314 and the input pattern 151 as one or more second similarity values. The second calculator 517 combines the similarity value 161, the similarity value 181, the similarity value 182, the similarity value 183, and the similarity value 184 to calculate a combined similarity value.

As described above, the same advantages as in the first embodiment can be achieved in the third modified example. Particularly, according to the third modified example, it is possible to cope with a case in which the number of registered patterns is insufficient.

Fourth Modified Example

Figure 10:
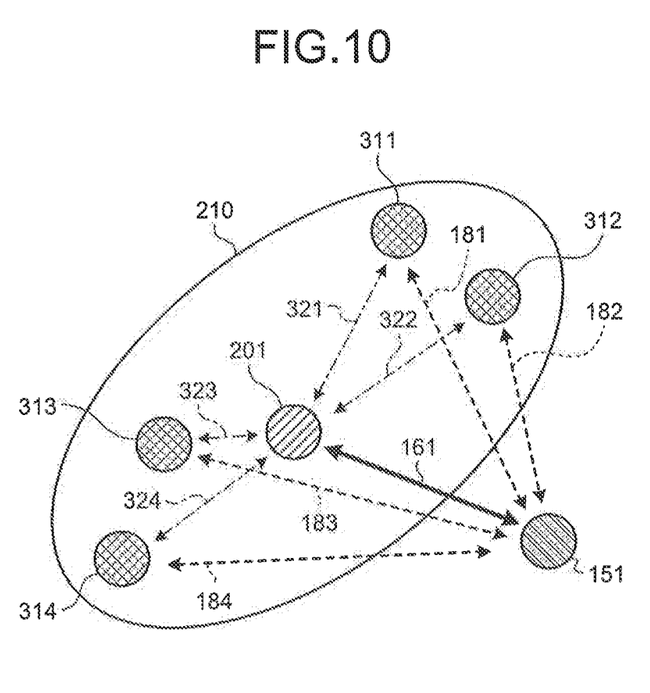
FIG. 10 is a diagram illustrating an example of a first similarity value, a second similarity value, and a degree of closeness in a fourth modified example.

The combined similarity value in the third modified example may include a degree of closeness between each of one or more second registered patterns and the first registered pattern. In this case, the second calculator 117 can combine the first similarity value, one or more second similarity values, and the degree of closeness between each of one or more second registered patterns and first reference patterns and the first registered pattern to calculate a combined similarity value.

FIG. 10 is a diagram illustrating an example of the first similarity value, the second similarity value, and the degree of closeness in the fourth modified example. In the example illustrated in FIG. 10, the second calculator 517 combines a degree of closeness 321 between the first reference pattern 311 and the first registered pattern 201, a degree of closeness 322 between the first reference pattern 312 and the first registered pattern 201, a degree of closeness 323 between the first reference pattern 313 and the first registered pattern 201, and a degree of closeness 324 between the first reference pattern 314 and the first registered pattern 201 in addition to the similarity value 161, the similarity value 181, the similarity value 182, the similarity value 183, and the similarity value 184 described in the example illustrated in FIG. 9 to calculate a combined similarity value.

Fifth Modified Example

In the second embodiment, when the number of registered patterns is insufficient, reference patterns may be used.

Figure 11:
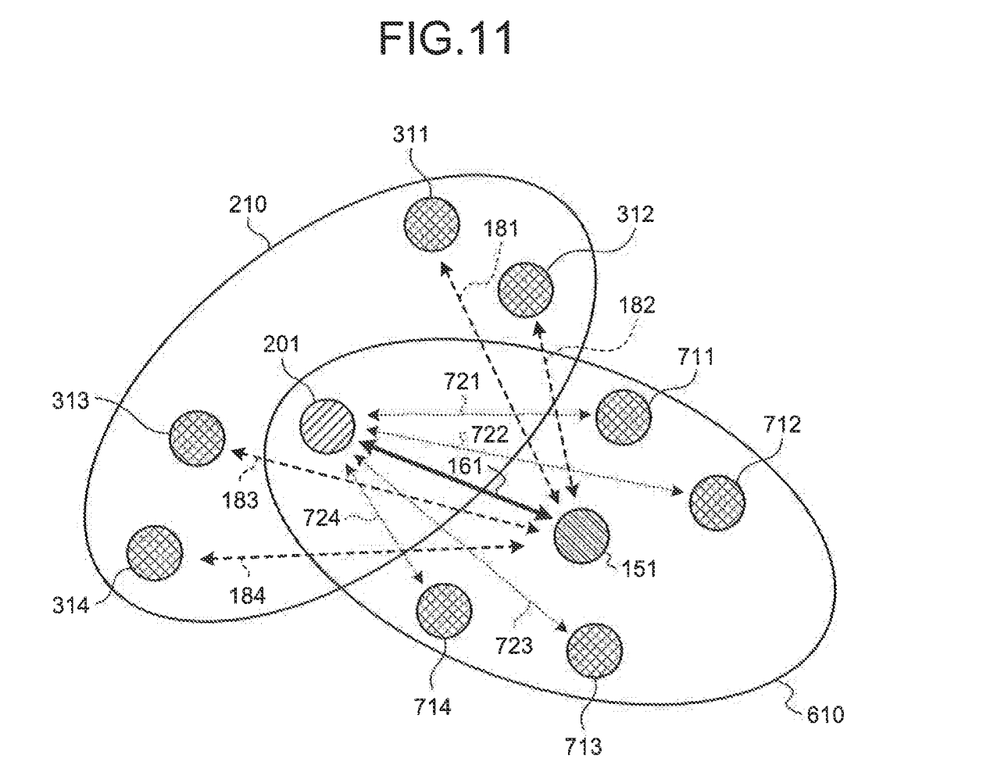
FIG. 11 is a diagram illustrating an example of a first similarity value, a second similarity value, and a third similarity value in a fifth modified example.

In this case, the first calculator 513 sets plural reference patterns and additionally calculates a degree of closeness between each of the plural registered patterns and each of the plural reference patterns and a degree of closeness between each of the plural reference patterns and the input pattern. The method of calculating the degree of closeness is the same as the method of calculating the degree of closeness between the registered patterns, which is described in the first embodiment.

The second calculator 517 calculates a similarity value between each of one or more second registered patterns and the first reference patterns having a neighbor relationship with the first registered pattern among the plural registered patterns and the plural reference patterns and the input pattern as one or more second similarity values. The second calculator 517 calculates a similarity value between each of one or more third registered patterns and second reference patterns having a neighbor relationship with the input pattern among the plural registered patterns and the plural reference patterns and the first registered pattern as one or more third similarity values.

FIG. 11 is a diagram illustrating an example of the first similarity value, the second similarity value, and the third similarity value in the fifth modified example. In the example illustrated in FIG. 11, the first registered pattern 201, the input pattern 151, and the similarity value 161 are the same as illustrated in FIG. 6.

In the example illustrated in FIG. 11, patterns 311 to 314 are one or more first reference patterns (hereinafter, referred to as "first reference patterns 311 to 314") having a neighbor relationship with the first registered pattern 201. Patterns 711 to 714 are one or more second reference patterns (hereinafter, referred to as "second reference patterns 711 to 714") having a neighbor relationship with the input pattern 151. That is, in the example illustrated in FIG. 11, k=4, the first reference patterns 311 to 314 are patterns of which the degree of closeness to the first registered pattern 201 is included in top four degrees of closeness, and the second reference patterns 711 to 714 are patterns of which the degree of closeness to the input pattern 151 is included in top four degrees of closeness. In the example illustrated in FIG. 11, there are no second registered pattern having a neighbor relationship with the first registered pattern 201 and no third registered pattern having a neighbor relationship with the input pattern 151.

In this case, the second calculator 517 calculates a similarity value 181 between the first reference pattern 311 and the input pattern 151, a similarity value 182 between the first reference pattern 312 and the input pattern 151, a similarity value 183 between the first reference pattern 313 and the input pattern 151, and a similarity value 184 between the first reference pattern 314 and the input pattern 151 as one or more second similarity values. The second calculator 517 calculates a similarity value 721 between the second reference pattern 711 and the first registered pattern 201, a similarity value 722 between the second reference pattern 712 and the first registered pattern 201, a similarity value 723 between the second reference pattern 713 and the first registered pattern 201, and a similarity value 724 between the second reference pattern 714 and the first registered pattern 201 as one or more third similarity values. The second calculator 517 combines the similarity value 161, the similarity value 181, the similarity value 182, the similarity value 183, the similarity value 184, the similarity value 721, the similarity value 722, the similarity value 723, and the similarity value 724 to calculate a combined similarity value.

As described above, the same advantages as in the second embodiment can be achieved in the fifth modified example. Particularly, according to the fifth modified example, it is possible to cope with a case in which the number of registered patterns is insufficient.

Sixth Modified Example

Figure 12:
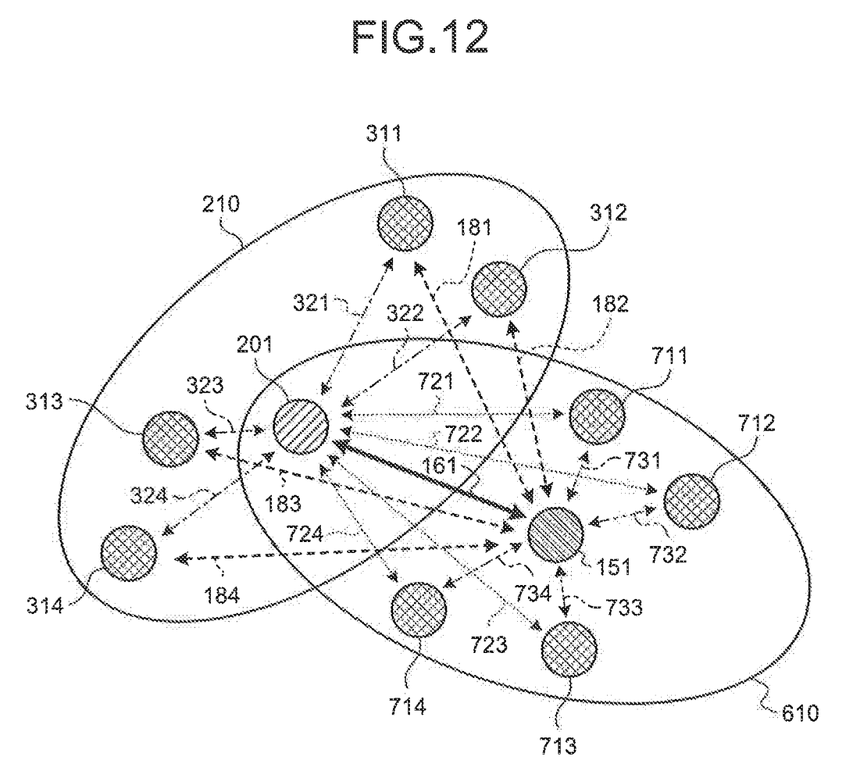
FIG. 12 is a diagram illustrating an example of a first similarity value, a second similarity value, a third similarity value, and a degree of closeness in a sixth modified example.

The combined similarity value in the fifth modified example may include a degree of closeness between each of one or more second registered patterns and first reference patterns and the first registered pattern and a degree of closeness between each of one or more third registered patterns and second reference patterns and the input pattern. In this case, the second calculator 517 can combine the first similarity value, one or more second similarity values, one or more third similarity values, the degree of closeness between each of one or more second registered patterns and first reference patterns and the first registered pattern, and the degree of closeness between each of one or more third registered patterns and second reference patterns and the input pattern to calculate a combined similarity value.

FIG. 12 is a diagram illustrating an example of the first similarity value, the second similarity value, the third similarity value, and the degree of closeness in the sixth modified example. In the example illustrated in FIG. 12, the second calculator 517 combines a degree of closeness 321 between the first reference pattern 311 and the first registered pattern 201, a degree of closeness 322 between the first reference pattern 312 and the first registered pattern 201, a degree of closeness 323 between the first reference pattern 313 and the first registered pattern 201, a degree of closeness 324 between the first reference pattern 314 and the first registered pattern 201, a degree of closeness 731 between the second reference pattern 711 and the input pattern 151, a degree of closeness 732 between the second reference pattern 712 and the input pattern 151, a degree of closeness 733 between the second reference pattern 713 and the input pattern 151, and a degree of closeness 734 between the second reference pattern 714 and the input pattern 151 in addition to the similarity value 161, the similarity value 181, the similarity value 182, the similarity value 183, the similarity value 184, the similarity value 721, the similarity value 722, the similarity value 723, and the similarity value 724 described in the example illustrated in FIG. 11 to calculate a combined similarity value.

Applications

The recognition devices described in the first and second embodiments and the first to sixth modified examples can be useful for face recognition, object recognition, character recognition, and the like.

In the case of face recognition (face comparison), feature values of the patterns such as the registered patterns, the input pattern, and the reference patterns are generated as follows.

First, a face is detected from an image to be processed by a face detection technique. The face detection can be performed using any method, and can be performed, for example, using a method described in Mita, "Co-occurrence-based Joint Harr-like Features Suitable for Face Detection", Journal of the Institute of Electronics, Information, and Communication Engineers, J89-D, 8, 2006, p. 1791-1801.

Then, coordinates of a face part in the image are detected from the detected face area using parts of a face as feature points. Detection of a face feature point can be performed using any method, and can be performed, for example, using a method described in Yuasa, Takeguchi, Kosakatani, and Yamaguchi, "Automatic Extraction of Face Feature Points for Still Image Face Recognition", Technical Report PERU 2006-222, pp. 5-10, 2007.

Then, a face pattern in which a direction and a size of a face are three-dimensionally normalized is generated using the detected coordinates of the feature point. For example, a normalized pattern can be generated using a method described in Japanese patent No. 4653606.

Finally, the feature value is extracted from the normalized face pattern. Extraction of the feature value can be performed using any method, and the feature value can be extracted, for example, using Japanese Patent No. 4459137.

As the face recognition (the face comparison), 1:N type face comparison of comparing plural registered face images (registered patterns) with, a comparison face image (the input pattern) and determining whether a coinciding face is present and 1:1 type face comparison of determining whether two face images are the same or not are used.

The 1:N type face comparison does not need to use reference face images (reference patterns) and thus is performed in the recognition devices according to the first and second embodiments and the first and second modified examples.

Here, it as assumed that a feature value of a face image serving as the first registered pattern is defined as a d-dimensional vector $x_t$, a feature value of a face image serving as the input pattern is defined as a d-dimensional vector $x_q$, a feature value of a face image serving as the second registered pattern is defined as a d-dimensional vector $r_{t,k}$, and a feature value of a face image serving as the third registered pattern is defined as a d-dimensional vector $r_{q,k}$.

In this case, the combined similarity value in the recognition device according to the first embodiment is a combination of a similarity value between $x_t$ and $x_q$ (the first similarity value) and k similarity values between $x_q$ and $r_{t,k}$ (the second similarity values), and the combined similarity value in the recognition device according to the second embodiment is a combination of a similarity value between $x_t$ and $x_q$ (the first similarity value), k similarity values between $x_q$ and $r_{t,k}$ (the second similarity values), and k similarity values between $x_t$ and $r_{q,k}$ (the third similarity values).

On the other hand, the 1:1 type face comparison needs to use reference face images (reference patterns) and thus is performed in the recognition devices according to the third to sixth modified examples.

Here, it is assumed that a feature value of a face image serving as the first registered pattern is defined as a d-dimensional vector $x_t$, a feature value of a face image serving as the input pattern is defined as, a d-dimensional vector $x_q$, a feature value of a face image serving as the first reference pattern is defined as a d-dimensional vector $v_{t,k}$, and a feature value of a face image serving as the second reference pattern is defined as a d-dimensional vector $v_{q,k}$.

In this case, the combined similarity value in the recognition device according to the third modified example is a combination of a similarity value between $x_t$ and $x_q$ (the first similarity value) and k similarity values between $x_q$ and $v_{t,k}$ (the second similarity values), and the combined similarity value in the recognition device according to the fifth modified example is a combination of a similarity value between $x_t$ and $x_q$ (the first similarity value), k similarity values between $x_q$ and $v_{t,k}$ (the second similarity values), and k similarity values between $x_t$ and $v_{q,k}$ (the third similarity values).

In the case of object recognition, feature values of the patterns such as the registered patterns, the input pattern, and the reference patterns are generated as follows.

First, an object is detected from an image to be processed by an object detection technique. The object detection can be performed using any method, and can be performed, for example, using a method described in Ming-Ming Cheng, Ziming Zhang, Wen-Yan Lin, Philip H. S. Torr, "BING: Binarized Normed Gradients for Objectness Estimation at 300 fps", IEEE International Conference on Computer Vision and Pattern Recognition (IEEE CVPR), 2014, 2386-2393.

Then, the feature value is extracted from the detected object area. Extraction of the feature value can be performed using any method, and the feature value can be extracted, for example, using a method described in Dalal N, Triggs B (2005) Histograms of oriented gradients for human detection, In: Computer Vision and Pattern Recognition, IEEE Computer Society Conference on Volume vol. 1, pp. 886-893.

In the object recognition, there are a case in which a feature value (a registered pattern) is extracted from a single still image to perform the recognition and a case in which plural feature values (registered patterns) are extracted from a moving image to perform the recognition.

In a case in which a feature value extracted from a single still image is used, the feature value of each category is a single vector and the similarity value can be calculated by the same processes as in the 1:N type face recognition.

On the other hand, in a case in which plural feature values extracted from a moving image are used, subspaces may be calculated from a set of feature values of one category and the similarity value may be calculated by the mutual subspace method, or the same calculation can be performed using all the feature values by providing a restriction not to select plural feature values in the same category when calculating k degrees of closeness.

In the case of character recognition of determining what character code a character image cut as one character corresponds to, feature values of the patterns such as the registered patterns, the input pattern, and the reference patterns are generated as follows.

In this case, the feature value is extracted from a character image to be processed. Extraction of the feature value can be per using any method, and the feature value can be extracted, for example, using a method described in Kawamura, A. et al. "Online recognition of freely handwritten Japanese characters using directional feature densities". Proceedings of 11$^{th}$ International Conference on Pattern Recognition (ICPR1992). The Hague, The Netherlands, 1992-08, IAPR 1992, p. 183-186.

In general, since plural character codes to be registered are present, a similarity value to the character codes can be calculated in the same as in the object recognition.

Hardware Configuration

Figure 13:
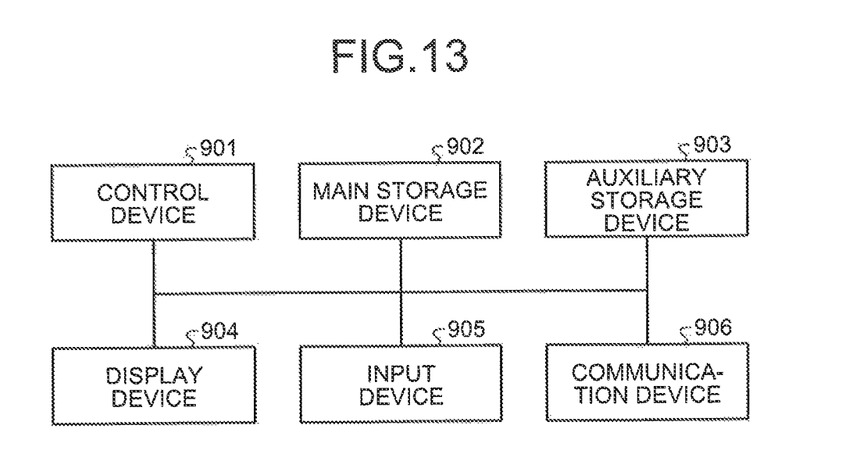
FIG. 13 is a diagram illustrating an example of a hardware configuration of the recognition devices according to the embodiments and the modified examples.

FIG. 13 is a diagram illustrating an example of a hardware configuration of the recognition devices according to the embodiments and the modified examples. As illustrated in FIG. 13, the recognition devices according to the embodiments and the modified examples includes a control device 901 such as a CPU, a main storage device 902 such as a ROM or a RAM, an auxiliary storage device 903 such as an HDD or an SSD, a display device 904 such as a display, an input device 905 such as a keyboard or a mouse, and a communication device 906 such as a communication interface and has a hardware configuration using a general computer.

The programs which are executed by the recognition devices according to the embodiments and the modified examples may be recorded on a computer-readable recording medium such as a CD-ROM, a CD-R, a memory card, a digital versatile disk (DVD), or a flexible disk (FD) in a file of a format which can be installed and executed, in such devices and may be provided.

The programs which are executed by the recognition devices according to the embodiments and the modified examples may be stored in a computer connected to a network such as Internet and may be provided by downloading the programs via the network. The programs which are executed by the recognition devices according to the embodiments and the modified examples may be provided or distributed via a network such as Internet. The programs which are executed by the recognition devices according to the embodiments and the modified examples may be provided in a state in which the programs are stored in advance in the ROM or the like.

The programs which are executed by the recognition devices according to the embodiments and the modified examples are configured as modules for embodying the above-mentioned units in a computer. In an actual hardware configuration, the above-mentioned units are embodied in the computer by causing the CPU to read and execute the programs from the ROM, the MUD, or the like to the RAM.

The present invention is not limited to the recognition devices according to the embodiments and the modified examples, but can be embodied by modifying the elements thereof without departing from the gist thereof in the step of putting the invention into practice. Various inventions can be made by appropriately combining plural elements disclosed in the embodiments and the modified examples. For example, some elements may be deleted from all the elements in the embodiments and the modified examples. Elements according to different embodiments and modified examples may be appropriately combined.

For example, the steps in the flowcharts according to the embodiments may be changed in the performing order, may be simultaneously performed, or may be performed in different orders whenever the steps are performed, unless contrary to the nature thereof.

As described above, according to the recognition devices according to the embodiments and the modified examples, it is possible to suppress costs and to enhance similarity calculation accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation device comprising:
    a processor configured to:
        register a plurality of registered patterns comprising a set of a feature value extracted from an image, each pattern corresponding to an object target of a plurality of targets, the object target being extracted from a moving image;
        calculate a degree of closeness between the registered patterns using a normalized cross-correlation;
        receive an input pattern;
        set a registered pattern which is not yet set as a first registered pattern among the registered patterns, as the first registered pattern;
        generate a category including the first registered pattern among the registered patterns and one or more second registered patterns having a highest degree of closeness with the first registered pattern among the registered patterns;
        calculate a first similarity value between the input pattern and the first registered pattern in the category;
        calculate one or more second similarity values between the input pattern and the one or more second registered patterns in the category, the one or more second similarity values being different from the first similarity value;
        calculate a combined similarity value in which the first similarity value and the one or more second similarity values are combined as a similarity value of the category;
        perform the setting of the registered pattern, the generating of the category, the calculating of the first similarity value, the calculating of the one or more second similarity values, and the calculating of the combined similarity value repeatedly until any registered pattern not set as the first registered pattern does not remain in the plurality of registered patterns;
        recognize that the input pattern belongs to the category based on the plurality of combined similarity values; and
        output the combined similarity values calculated.

2. The device according to claim 1, wherein the processor is further configured to combine the first similarity value, the one or more second similarity values, and degrees of closeness between the one or more second registered patterns and the first registered pattern to calculate a second combined similarity value as the combined similarity value.

3. The device according to claim 1, wherein the processor is configured to further
calculate degrees of closeness between the registered patterns and the input pattern using a normalized cross-correlation,
calculate one or more third similarity values between the first registered pattern and one or more third registered patterns having a highest degree of closeness with the input pattern among the registered patterns;
combine the first similarity value, the one or more second similarity values, and the one or more third similarity values to calculate a third combined similarity value as the combined similarity value; and
perform the calculating of the one or more third similarity values and the combining repeatedly until any registered pattern not set as the first registered pattern does not remain in the plurality of registered patterns.

4. The device according to claim 3, wherein the processor is further configured to combine the first similarity value, the one or more second similarity values, the one or more third similarity values, the degrees of closeness between the one or more second registered patterns and the first registered pattern, and the degrees of closeness between the one or more third registered patterns and the input pattern to calculate a fourth combined similarity value as the combined similarity value.

5. The device according to claim 1, wherein the processor is further configured to
set a plurality of reference patterns,
calculate degrees of closeness between the registered patterns and the plurality of reference patterns using a normalized cross-correlation, and
calculate, as the one or more second similarity values, similarity values between the input pattern and one or more second registered patterns and first reference patterns having a highest degree of closeness with the first registered pattern among the registered patterns and the plurality of reference patterns.

6. The device according to claim 5, wherein the processor is further configured to combine the first similarity value, the one or more second similarity values, and the degrees of closeness between the first registered pattern and the one or more second registered patterns and first reference patterns to calculate a fifth combined similarity value as the combined similarity value.

7. The device according to claim 5, wherein the processor is configured to further
calculate degrees of closeness between the registered patterns and the input pattern and degrees of closeness between the plurality or reference patterns and the input pattern using a normalized cross-correlation,
calculate one or more third similarity values between the first registered pattern and one or more third registered patterns and second reference patterns having a highest degree of closeness with the input pattern among the registered patterns and the plurality of reference patterns, and
combine the first similarity value, the one or more second similarity values, and the one or more third similarity values to calculate a six combined similarity value as the combined similarity value.

8. The device according to claim 7, wherein the processor is further configured to combine the first similarity value, the one or more second similarity values, the one or more third similarity values, the degrees of closeness between the first registered pattern and the one or more second registered patterns and first reference patterns, and the degrees of closeness between the input pattern and the one or more third registered patterns and second reference patterns to calculate a seventh combined similarity value as the combined similarity value.

9. A recognition device comprising:
a processor configured to:
register a plurality of patterns comprising a set of a feature value extracted from an image, each pattern corresponding to an object target of a plurality of targets, the object target being extracted from a moving image;
calculate a degree of closeness between the registered patterns using a normalized cross-correlation;
receive an input pattern;
set a registered pattern which is not yet set as a first registered pattern among the registered patterns, as the first registered pattern;
generate a category including a first registered pattern among the registered patterns and one or more second registered patterns having a highest degree of closeness with the first registered pattern among the registered patterns;
calculate, for each of the registered patterns, a first similarity value between the input pattern and the first registered pattern in the category;
calculate one or more second similarity values between the input pattern and the one or more second registered patterns in the category, the second similarity values being different from the first similarity value;
calculate a combined similarity value in which the first similarity value and the one or more second similarity values are combined as a similarity value of the category;
perform the setting of the first registered pattern, the generating of the category, the calculating of the first similarity value, the calculating of the one or more second similarity values, and the calculating of the combined similarity value repeatedly until any registered pattern not set as the first registered pattern does not remain in the plurality of registered patterns;
recognize that the input pattern belongs to the category based on the plurality of combined similarity values; and
output a category to which the input pattern belongs.

10. The device according to claim 9, wherein the processor is further configured to combine the first similarity value, the one or more second similarity values, and degrees of closeness between the one or more second registered patterns and the first registered pattern to calculate a second combined similarity value as the combined similarity value.

11. The device according to claim 9, wherein the processor is configured to further calculate degrees of closeness between the registered patterns and the input pattern using a normalized cross-correlation,
calculate one or more third similarity values between the first registered pattern and one or more third registered patterns having a highest degree of closeness with the input pattern among the registered patterns;
combine the first similarity value, the one or more second similarity values, and the one or more third similarity values to calculate a third combined similarity value as the combined similarity value; and
perform the calculating of the one or more third similarity values and the combining repeatedly until any registered pattern not set as the first registered pattern does not remain in the plurality of registered patterns.

12. The device according to claim 11, wherein the processor is further configured to combine the first similarity value, the one or more second similarity values, the one or more third similarity values, the degrees of closeness between the one or more second registered patterns and the first registered pattern, and the degrees of closeness between the one or more third registered patterns and the input pattern to calculate a fourth combined similarity value as the combined similarity value.

13. The device according to claim 9, wherein the processor is further configured to set a plurality of reference patterns, calculate degrees of closeness between the registered patterns and the plurality of reference patterns using a normalized cross-correlation, and calculate, as the one or more second similarity values, similarity values between the input pattern and one or more second registered patterns and first reference patterns having a highest degree of closeness with the first registered pattern among the registered patterns and the plurality of reference patterns.

14. The device according to claim 13, wherein the processor is further configured to combine the first similarity value, the one or more second similarity values, and the degrees of closeness between the first registered pattern and the one or more second registered patterns and first reference patterns to calculate a fifth combined similarity value as the combined similarity value.

15. The device according to claim 13, wherein the processor is configured to further calculate degrees of closeness between the registered patterns and the input pattern and degrees of closeness between the plurality of reference patterns and the input pattern using a normalized cross-correlation, calculate one or more third similarity values between the first registered pattern and one or more third registered patterns and second reference patterns having a highest degree of closeness with the input pattern among the registered patterns and the plurality of reference patterns, and combine the first similarity value, the one or more second similarity values, and the one or more third similarity values to calculate a sixth combined similarity value as the combined similarity value.

16. The device according to claim 15, wherein the processor is further configured to combine the first similarity value, the one or more second similarity values, the one or more third similarity values, the degrees of closeness between the first registered pattern and the one or more second registered patterns and first reference patterns, and the degrees of closeness between the input pattern and the one or more third registered patterns and second reference patterns to calculate a seventh combined similarity value as the combined similarity value.

17. The device according to claim 9, wherein the processor is further configured to recognize that the input pattern belongs to a category of the first registered pattern in which the combined similarity value having the highest similarity value is calculated among the plurality of combined similarity values.

18. The device according to claim 9, wherein the processor is further configured to recognize that the input pattern belongs to a category of one or more first registered patterns in which the combined similarity value having a similarity value equal to or greater than a threshold value is calculated among the plurality of combined similarity values.

* * * * *